US010572559B2

(12) United States Patent
Deluca et al.

(10) Patent No.: US 10,572,559 B2
(45) Date of Patent: Feb. 25, 2020

(54) RECALLING DIGITAL CONTENT UTILIZING CONTEXTUAL DATA

(71) Applicant: INTERNATIONAL BUSINESS MACHINES CORPORATION, Armonk, NY (US)

(72) Inventors: Lisa Seacat Deluca, Baltimore, MD (US); Jenny S. Li, Danbury, CT (US); Dana L. Price, Surf City, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 15/463,221

(22) Filed: Mar. 20, 2017

(65) Prior Publication Data

US 2018/0268064 A1 Sep. 20, 2018

(51) Int. Cl.
G06F 17/30 (2006.01)
G06F 16/9535 (2019.01)
G06F 16/958 (2019.01)

(52) U.S. Cl.
CPC ........ *G06F 16/9535* (2019.01); *G06F 16/958* (2019.01)

(58) Field of Classification Search
USPC ....................................................... 707/768
See application file for complete search history.

(56) References Cited

U.S. PATENT DOCUMENTS 8,510,282 B2 8/2013 Murali
2012/0166468 A1* 6/2012 Gupta ............... G06Q 30/0256
707/768
2013/0013595 A1 1/2013 Tseng et al.
(Continued)

FOREIGN PATENT DOCUMENTS

WO 2013044476 4/2013

OTHER PUBLICATIONS

Tulving, "Episodic and Semantic Memory", http://alumni.media.mit.edu/~jorkin/generals/papers/Tulving_memory.pdf, Academic Press, 1972, 24 pages.
(Continued)

*Primary Examiner* — Kim T Nguyen
(74) *Attorney, Agent, or Firm* — William Hartwell; Andrew D. Wright; Roberts Mlotkowski Safran Cole & Calderon, P.C.

(57) ABSTRACT

Systems and methods for recalling digital content utilizing contextual data are disclosed. In embodiments, a method includes: determining, by a computing device, that a user has accessed a content item from a content resource; associating, by the computing device, the content item with session data, the session data including a route between a first location and a second location; receiving, by the computing device, a first search query; determining, by the computing device, one or more potential user sessions of interest based on the first search query; receiving, by the computing device, a second search query directed to the content item; and filtering, by the computing device, search results of the second search query based on the one or more potential user sessions of interest to produce filtered search results including one or more content items associated with the session data.

17 Claims, 4 Drawing Sheets

(56) References Cited

U.S. PATENT DOCUMENTS

| | | | |
|---|---|---|---|
| 2015/0100567 A1* | 4/2015 | Weir | G01C 21/32 |
| | | | 707/722 |
| 2015/0178409 A1* | 6/2015 | Kernan | G06F 16/9038 |
| | | | 707/722 |
| 2015/0227539 A1* | 8/2015 | Tan | G06Q 30/0247 |
| | | | 707/722 |
| 2016/0055175 A1* | 2/2016 | Thompson | G06F 16/9537 |
| | | | 707/722 |
| 2016/0125054 A1* | 5/2016 | Walker | G06F 16/29 |
| | | | 707/722 |
| 2016/0147756 A1* | 5/2016 | Dalili | G06F 16/9535 |
| | | | 707/727 |
| 2017/0164217 A1* | 6/2017 | Lazarescu | H04L 67/142 |
| 2018/0233149 A1* | 8/2018 | Mattingly | G06F 3/167 |

OTHER PUBLICATIONS

List of IBM Patents or Patent Applications Treated as Related, Nov. 12, 2019, 1 page.

Specification "Recalling Digital Content Utilizing Contextual Data" and Drawings in U.S. Appl. No. 16/678,284, filed Nov. 8, 2019, 31 pages.

* cited by examiner

RECALLING DIGITAL CONTENT UTILIZING CONTEXTUAL DATA

BACKGROUND

The present invention relates generally to recalling digital content and, more particularly, to recalling digital content utilizing contextual data.

Many software applications present dynamic content that shifts over time. Users often review content (digital content), and then desire to recall the content at a later time. It may be difficult for a user to find a particular previously accessed content item at a later date, due to the user's fading memory and the large amounts of content available and/or accessed by the user. Frequent users of public transport, passenger commuters or business travelers may have a particular problem recalling a specific content item viewed during traveling, due to changes in routine, multitasking and other factors that may affect the user's ability to remember details of the content that the user wishes to recall.

SUMMARY

In an aspect of the invention, a computer-implemented method includes: determining, by a computing device, that a user has accessed a content item from a content resource; associating, by the computing device, the content item with session data, the session data including a route between a first location and a second location; receiving, by the computing device, a first search query; determining, by the computing device, one or more potential user sessions of interest based on the first search query; receiving, by the computing device, a second search query directed to the content item; and filtering, by the computing device, search results of the second search query based on the one or more potential user sessions of interest to produce filtered search results including one or more content items associated with the session data.

In another aspect of the invention, there is a computer program product for recalling digital content utilizing contextual data. The computer program product comprises a computer readable storage medium having program instructions embodied therewith. The program instructions are executable by a computing device to cause the computing device to: determine that a user has accessed a content item from a content resource during a travel session; associate the content item with travel session data of the travel session, the travel session data include a route between a first location and a second location traveled by the user during the travel session; receive a first search query; determine one or more potential user travel sessions of interest based on the first search query; receive a second search query directed to the content item; filter search results of the second search query based on the one or more potential travel sessions of interest to produce filtered search results including one or more content items accessed by the user during the travel session; and present the filtered search results to a user.

In another aspect of the invention, there is a system for recalling digital content utilizing contextual data. The system includes a CPU, a computer readable memory and a computer readable storage medium associated with a computing device; program instructions to determine that a user has accessed a content item from a content resource during a session; program instructions to associate the content item with route data associated with the session, the route data including a route between a first location and a second location traveled by the user during the session; program instructions to receive a first search query; program instructions to determine one or more potential user sessions of interest based on the first search query; program instructions to receive a second search query directed to the content item; program instructions to filter search results of the second search query based on the one or more potential sessions of interest to produce filtered search results including one or more content items accessed by the user during the session; and program instructions to present the filtered search results to a user; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
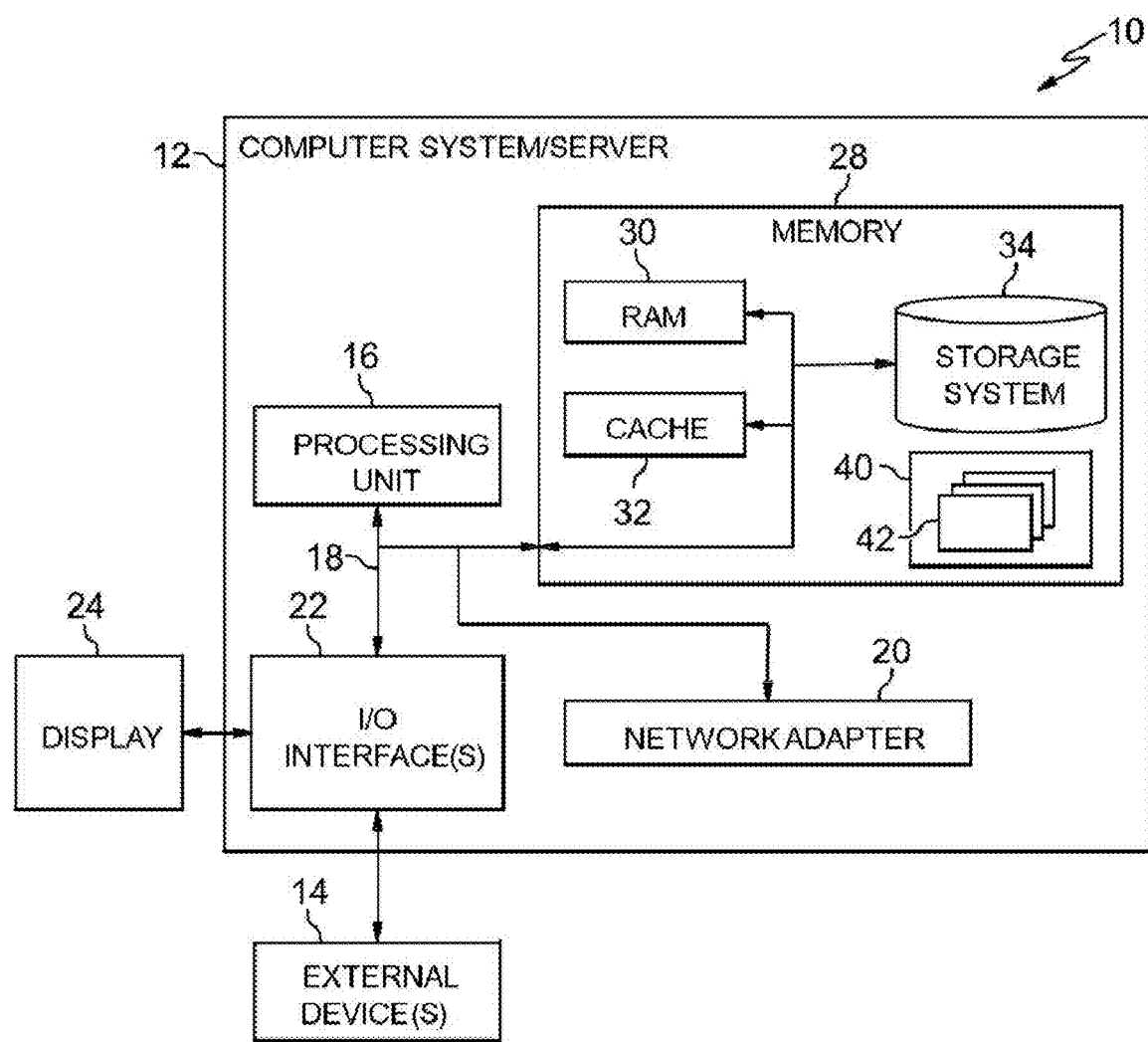
FIG. 1 depicts a computing infrastructure according to an embodiment of the present invention.

The present invention relates generally to recalling digital content and, more particularly, to recalling digital content utilizing contextual data. In embodiments, a system and method is provided for contextual recall of an item of interest based on a route traveled by the user. For example, when a user wants to recall business forms accessed during a travel session, but does not recall exactly where or when the forms were accessed, the user can select a travel session and receive filtered search results including one or more content items accessed during the travel session. In embodiments, the invention enables a user to recall previously accessed content based on contextual data when the user does not know their exact location when the content was accessed, but does know that the content was accessed on a particular route, such as when flying from a starting point to a destination point.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
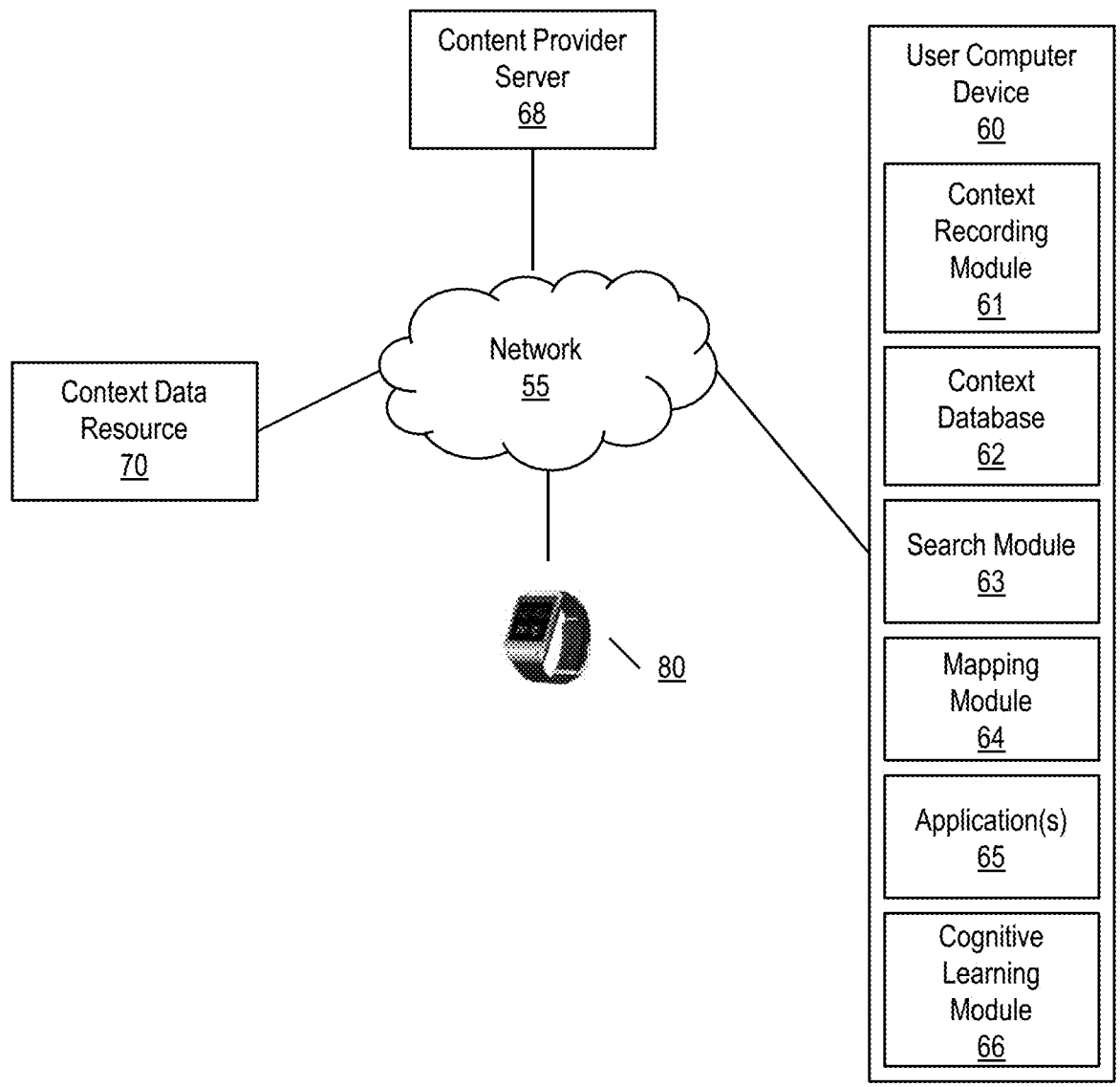
FIG. 2 shows an exemplary environment in accordance with aspects of the invention.

FIG. 2 shows an exemplary environment in accordance with aspects of the invention. The environment includes a user computer device 60 connected to a network 55. The user computer device 60 may comprise a computer system 12 of FIG. 1, and may be connected to the network 55 via the network adapter 20 of FIG. 1. The user computer device 60 may be a general purpose computing device, such as a desktop computer, laptop computer, tablet computer, smartphone, etc. In aspects, the user computer device 60 includes a context recording module 61, a context database 62, a search module 63, a mapping module 64, one or more software applications indicated at 65 utilized to access a content item of interest (digital content) during a travel session of the user, and a cognitive learning module 66. The recording module 61, search module 63, mapping module 64 and cognitive learning module 66 may be configured to perform one or more of the functions described herein, and may include one or more program modules (e.g., program module 42 of FIG. 1) executed by the user computer device 60.

In embodiments, the context recording module 61 is configured to record travel data (e.g., route data and traffic data) and other user context data, and associate the context data with one or more content items of interest accessed during a travel session. In aspects, the context recording module 61 saves the associated data in the context database 62. In embodiments, the search module 63 is configured to enable a user to perform a search of the associated data in the context database 62 to retrieve one or more content items of interest viewed by a user during a travel session. In aspects, the mapping module 64 is configured to display one or more maps of routes traveled during travel sessions of a user. Additionally, in embodiments, the cognitive learning module 66 is configured to determine that content items of interest accessed during a travel session meet predetermined parameters, record an association between the content item of interest and the parameters, determine that a new travel session meets the parameters, and automatically present the content item of interest to the user.

In aspects, the user computer device 60 accesses content items of interest available through a content provider server 68 via the network 55. In embodiments, the content provider server 68 may be a special computing device for providing digital content to one or more user computer device 60, and may include components of computer system 12.

The network 55 may be any suitable communication network or combination of networks, such as a local area network (LAN), a general wide area network (WAN), and/or a public network (e.g., the Internet). In embodiments, the user computer device 60 is in communication with a context data resource 70. The context data resource 70 may be a third party server or other source of context data. By way of example, the context data resource 70 may be a server providing weather data, traffic data, airline data (e.g., delays), etc. In embodiments, the user computer device 60 is in communication with a data gathering device 80, such as a smartwatch or a remote global positioning system (GPS).

Figure 3:
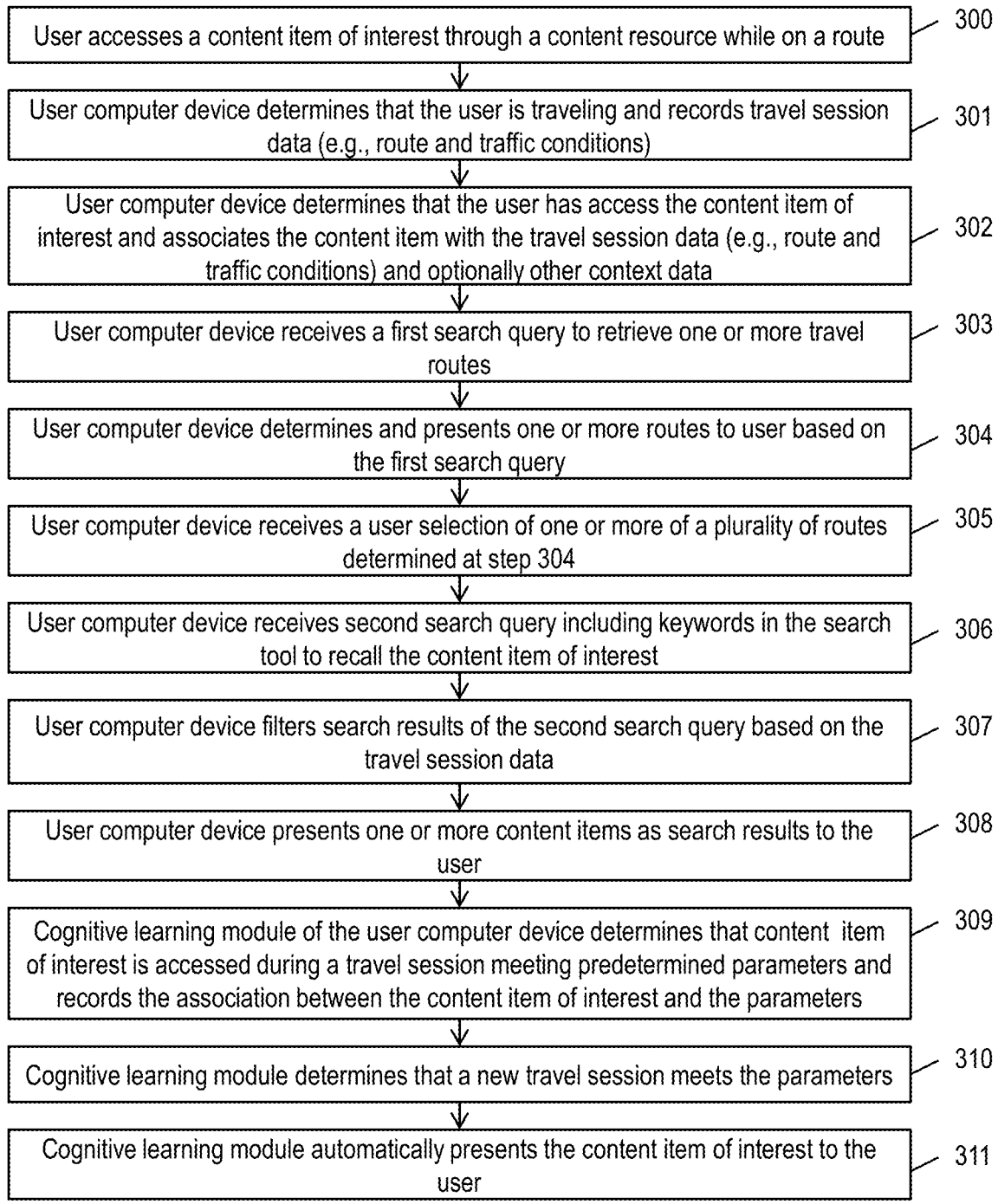
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300 a user accesses a content item of interest (digital content such as a website, document, etc.) through a content resource while traveling. In embodiments, a user accesses and utilizes the operating system of the user computer device 60 or an application 65 of the computer device 60 to access one or more content resources. The computer device 60 may record historic access of the content provider server 68 (e.g., web browser history, social media timeline records, comment data/time, document access date/time, etc.). By way of example, a user traveling from a Point A to a Point B on an airplane may access client documents on a content provider server 68 via the user computer device 60.

At step 301, the user computer device 60 determines that the user is traveling and records the session data (e.g., travel session data including route and traffic conditions). The user computer device 60 may utilize location technology, such as GPS technology, wireless triangulation, etc. in step 301. Route data may include source and destination locations during a session (e.g., travel session between a user's office to a client site). In embodiments, the user computer device 60 obtains travel data from a remote data gathering device 80 (e.g., vehicle sensors, smartwatch, etc.). In aspects, the user computer device 60 gathers context data related to the travel session from the context data resource 70 (e.g., traffic data, airline travel data, public transportation scheduling data, etc.). By way of example, the user computer device 60 may gather traffic data (e.g., waiting at a red light, driving >60 miles per hour, heavy traffic jam, etc.) as part of the travel session data recorded at step 301.

At step 302, the user computer device 60 determines that the user has accessed a content item of interest, and associates the content item of interest with the travel session data. In embodiments the context recording module 61 associates the content item of interest with the travel session data recorded at step 301. Optionally, the user computer device 60 associates the content item with the travel session data and other context data. Examples of other context data that may be utilized by the present invention include: data regarding individuals in the immediate vicinity (e.g., using application registration, Bluetooth, Near Field Communication, Wi-Fi, triangulation, etc.); Applications (e.g., an application 65) in use on the device; the device (e.g., user computer device 60) that was used while the user is accessing content items of interest; details of the user's calendar (e.g., sporting events, meetings, etc.); details from remote devices (e.g., music playing on digital devices, vehicle information, etc.); details about weather conditions during the travel session; interrupts from other applications while the user is browsing or commenting or posting content (content items of interest); current song or playlist accessed by the user; etc. Various methods of associating context data, including travel session data, with data identifying the content item of interest may be utilized in the performance of step 302. By way of example, the user computer device 60 may attach or tag a user's current context data as metadata to the content items of interest that is being viewed during a travel session and cause the content items of interest/context data to be stored in the user's browsing history. In aspects, the content item of interest itself may be stored, or a pointer to the content item of interest may be stored and associated with the content item of interest.

At step 303, the user computer device 60 receives a first search query to retrieve one or more travel routes. By way of example, a user may want to recall a business document accessed by the user utilizing a particular app when on route from the user's office to a client site, but may not recall where the user found the business documents. The user may input a first search query into the user computer device 60 utilizing functions provided by the search module 63, the search query comprising details of the route, along with other defining data related to the route. In embodiments, the first search query may contain context data relating to individuals (e.g., travel companions) within a predetermined proximity of the user during the time period that the content item of interest was accessed. In aspects, the first search query may contain context data related to an application (e.g., application 65) utilized during the time period that the content item of interest was accessed. In aspects, the first search query may contain traffic conditions during the time period that the content item of interest was accessed. Other context data (e.g., non-travel related context data) may also be entered in the first search query. Such as, for example, any of the types of data described with respect to step 302.

At step 304, the user computer device 60 determines and presents one or more travel routes to the user based on the first search query. In aspects, the search module 63 determines one or more routes traveled by the user that fit the terms of the first search query, and presents the one or more routes to the user.

At step 305, the computer device 60 receives a user selection of one of a plurality of routes determined at step 304. For example, the search module 63 may present the user with two routes that meet the search terms entered at step 303, along with additional information such as the time and date of the routes, and an option to select one or more of the two routes. The user may then select one or more routes that the user believes are the most likely routes traveled while accessing the content item of interest.

At step 306, the user computer device 60 receives a second search query from the user, including keywords to recall the content item of interest. For example, the user may search for the name of the document by typing the name of the document into a search window. It can be understood that any type of keyword for invoking different user context information could be utilized in accordance with embodiments of the invention.

At step 307, the user computer device 60 filters search results of the second search query based on the travel session data to obtain filtered search results. In embodiments, the search module 63 filters search results utilizing the data stored in the context database 62. The search module 63 may filter search results based on additional context data (non-travel session related context data), such as the additional context data discussed above with respect to step 302.

At step 308, the user computer device 60 presents one or more content items to the user as filtered search results. For example, the user computer device 60 may present the user with a link to a document of interest.

At step 309, the user computer device 60 may determine that a content item of interest is often or always accessed during travel sessions meeting certain parameters, and records the association. In aspects the cognitive learning module 66 determines that a content item of interest is always or often accessed during certain types of travel sessions (e.g., the bus schedule for New York city is always accessed when the user is traveling from their home office in Boston to the client cite in New York city), and records this association in the context database 62.

At step 310, the user computer device 60 determines that a new travel session meets the parameters of step 309. For example, the cognitive learning module 66 may recognize that the user is traveling from their home office in Boston to a client cite in New York City.

At step 311, the user computer device 60 automatically presents the content item of interest to the user. For example, the cognitive learning module 66 may automatically present a bus schedule for New York City to the user based on determining that the user is in route from their home office in Boston to a client cite in New York City. In this way, the user is presented with potentially useful information (content item of interest) without having to specifically recall context conditions associated with the potentially useful information.

Figure 4:
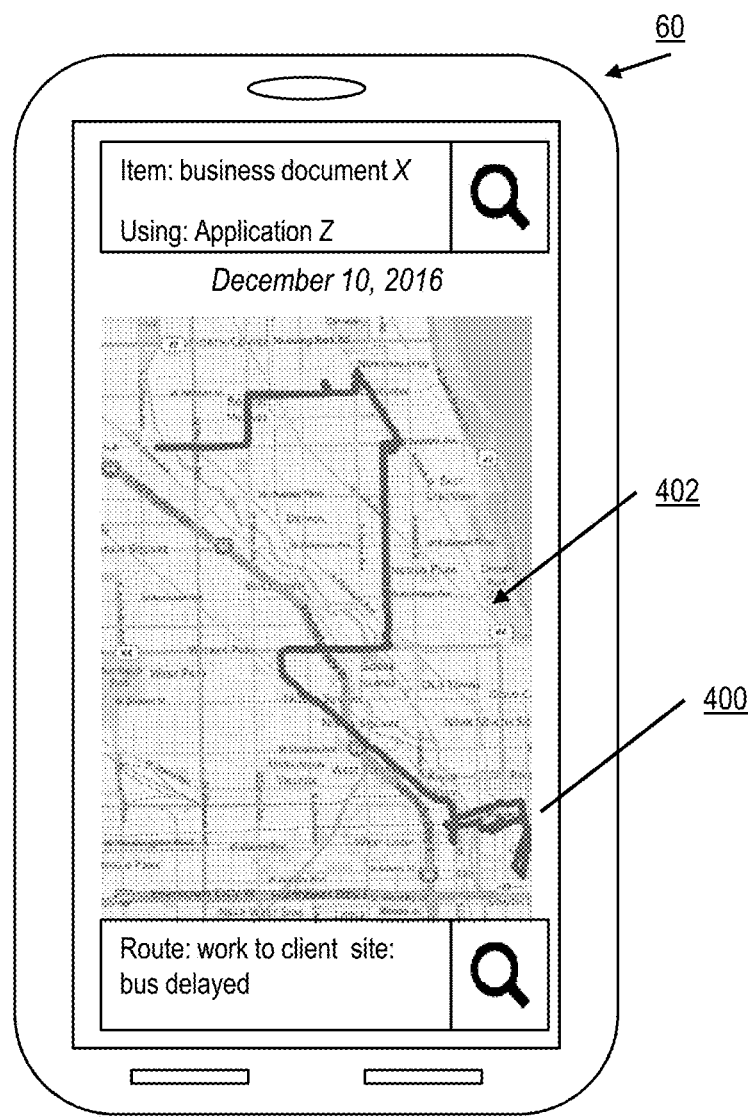
FIG. 4 shows an exemplary user interface for use with embodiments of the invention.

FIG. 4 shows an exemplary user interface for use with embodiments of the invention. In this example, the user inputs "Route: work to client site" in a search window of a user interface 400 of user computer device 60, in accordance with step 303 of FIG. 3, to reflect the fact that the user remembers accessing the business document X while on the way from the user's office to the client site. In this example, the user also recalls that the bus the user was riding when accessing the business document X was delayed, and then enters the additional search logic "bus delayed", as depicted in FIG. 4. The user computer device 60 determines that the user was on route between the user's office and the client cite on Dec. 10, 2016, and presents the route to the user in the form of a map 402 in accordance with step 304 of FIG. 3.

In an alternative embodiment not shown, the search module 63 may present the user with two routes that meet the description of "Route: work to client site; bus delayed" at step 304 of FIG. 3, and the search module 63 may present both routes to the user with additional information such as the time and date of the routes, along with an option to select one of the two routes. The user may then select a route that the user believes is the most likely route traveled while accessing the business document X (e.g., map 402 of FIG. 4), in accordance with step 305 of FIG. 3.

In the scenario of FIG. 4, the user searches for the name of the document by typing "Item: business document X" into a second search window, in accordance with step 306 of FIG. 3. Further, the user also remembers that they accessed the content item of interest (i.e., business document X) using an Application Z (e.g., application 65), so also searches for "Using: Application Z"). In accordance with step 307 of FIG. 3, the user computing device 60 filters search results from the second search query based on data associated with the route of map 402. In accordance with step 308 of FIG. 4, the user computer device 60 presents the document X to the user (not shown) based on the filtering. In the scenario of FIG. 4, the user computer device 60 may present a link to the business document X, for example.

In embodiments, a service provider could offer to perform the processes described herein. In this case, the service provider can create, maintain, deploy, support, etc., the computer infrastructure that performs the process steps of the invention for one or more customers. These customers may be, for example, any business that uses mobile technology while traveling. In return, the service provider can receive payment from the customer(s) under a subscription and/or fee agreement and/or the service provider can receive payment from the sale of advertising content to one or more third parties.

In still another embodiment, the invention provides a computer-implemented method for utilizing travel data for contextual recall of content. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recalling digital content utilizing contextual data, comprising:

determining, by a computing device, that a user has accessed a content item from a content resource during a user travel session;

associating, by the computing device, the content item with user travel session data, the user travel session data including a geographic route between a first location and a second location traveled by the user during the user travel session;

receiving, by the computing device, a first search query regarding a travel route;

determining, by the computing device, one or more potential user prior travel sessions of interest based on the first search query;

receiving, by the computing device, a second search query directed to the content item;

filtering, by the computing device, search results of the second search query based on the one or more potential user prior travel sessions of interest to produce filtered search results including one or more content items associated with the user travel session data;

presenting, by the computing device, one or more travel routes in response to the first search query; and receiving, by the computing device, a selection of the one or more of the travel routes from the user, wherein the selection indicates the one or more potential user prior travel sessions of interest, and wherein the filtering search results includes filtering search results of the second search query based on the travel session data of the selected one or more travel routes.

2. The method of claim 1, wherein one of the first and second search queries contains context information regarding individuals within a predetermined proximity of the user during the time period that the content item was accessed.

3. The method of claim 1, wherein one of the first and second search queries contains context information regarding applications of the computing device utilized during the time period that the content item was accessed.

4. The method of claim 1, further comprising: determining the user travel session meets predetermined parameters; and recording, by the computing device, an association between the predetermined parameters and the content item.

5. The method of claim 4, further comprising:
determining, by the computing device, that a new travel session of the user meets the predetermined parameters; and
automatically presenting, by the computing device, the content item to the user based on the association between the predetermined parameters and the content item.

6. The method of claim 1, further comprising:
determining, by the computing device, that the user is traveling between the first location and the second location based on global positioning system (GPS) data, wherein the traveling comprises the user travel session; and
associating, by the computing device, the content item with the user travel session data and context data obtained during the user travel session,
wherein the associating the content item with the user travel session data and the context data comprises attaching the user travel session data and the context data as metadata to the content item and storing the content item in a browsing history of the user, and
wherein the context data is selected from the group consisting of: details about weather conditions during the travel session; interrupts from other applications while the user is browsing, commenting or posting with regards to the content item; applications in use on the computing device during the user travel session; and a song or playlist accessed by the user during the user travel session.

7. A computer program product for recalling digital content utilizing contextual data, the computer program product comprising a computer readable storage medium having program instructions embodied therewith, the program instructions executable by a computing device to cause the computing device to:
determine that a user has accessed a content item from a content resource during a user travel session;
associate the content item with user travel session data, the user travel session data including a geographic route between a first location and a second location traveled by the user during the user travel session;
receive a first search query regarding the travel route;
determine one or more potential user prior travel sessions of interest based on the first search query;
receive a second search query directed to the content item;
filter search results of the second search query based on the one or more potential user prior travel sessions of interest to produce filtered search results including one or more content items associated with the user the travel session data; and
present one or more travel routes in response to the first search query; and
receive a selection of the one or more of the travel routes from the user, wherein the selection indicates the one or more potential user prior travel sessions of interest, and wherein the filtering search results includes filtering search results of the second search query based on the travel session data of the selected one or more travel routes.

8. The computer program product of claim 7, wherein the travel session data further comprising traffic condition data.

9. The computer program product of claim 7, wherein one of the first and second search queries contains context information regarding individuals within a predetermined proximity of the user during the time period that the content item was accessed.

10. The computer program product of claim 7, wherein one of the first and second search queries contains context information regarding applications of the computing device utilized during the time period that the content item was accessed.

11. The computer program product of claim 7, wherein the program instructions further cause the computing device to: determine that the content item is accessed during the travel session meeting predetermined parameters and recording an association between the predetermined parameters and the content item.

12. The computer program product of claim 11, wherein the program instructions further cause the computing device to:
determine that a new travel session meets the predetermined parameters; and
automatically present the content item to the user based on the determining that the new travel session meets the predetermined parameters.

13. A system for utilizing travel data for recalling digital content utilizing contextual data, comprising:
a CPU, a computer readable memory and a computer readable storage medium associated with a computing device;
program instructions to determine that a user has accessed a content item from a content resource during a user travel session;
program instructions to associate the content item with user travel session data, the user travel session data including a geographic route between a first location and a second location traveled by the user during the user travel session;
program instructions to receive a first search query regarding a travel route;
program instructions to determine one or more potential user prior travel sessions of interest based on the first search query;
program instructions to receive a second search query directed to the content item;
program instructions to filter search results of the second search query based on the one or more potential sessions of interest to produce filtered search results including one or more content items associated with the user travel session;
program instructions to present one or more travel routes in response to the first search query;
program instructions to receive a selection of the one or more of the travel routes from the user, wherein the selection indicates the one or more potential user prior travel sessions of interest, and wherein the filtering search results includes filtering search results of the second search query based on the travel session data of the selected one or more travel routes,
wherein the program instructions are stored on the computer readable storage medium for execution by the CPU via the computer readable memory.

14. The system of claim 13, wherein the route data further comprising traffic condition data.

15. The system of claim 13, wherein one of the first and second search queries contains context information regarding individuals within a predetermined proximity of the user during the time period that the content item was accessed.

16. The system of claim 13, wherein one of the first and second search queries contains context information regarding applications of the computing device utilized during the time period that the content item was accessed.

17. The system of claim 13, further comprising:
program instruction to determine that the content item is accessed during the session meeting predetermined parameters and recording an association between the predetermined parameters and the content item;
program instructions to determine that a new session meets the predetermined parameters; and
program instructions to automatically present the content item to the user based on the program instructions determining that the new session meets the predetermined parameters.

* * * * *